United States Patent
Lee et al.

(10) Patent No.: US 10,873,376 B2
(45) Date of Patent: Dec. 22, 2020

(54) OAM MULTIPLEXING COMMUNICATION SYSTEM, OAM MULTIPLEXING TRANSMISSION DEVICE, OAM MULTIPLEXING RECEIVING DEVICE, AND OAM MULTIPLEXING COMMUNICATION METHOD

(71) Applicant: NIPPON TELEGRAPH AND TELEPHONE CORPORATION, Tokyo (JP)

(72) Inventors: Doohwan Lee, Yokosuka (JP); Hirofumi Sasaki, Yokosuka (JP); Hiroyuki Fukumoto, Yokosuka (JP); Hiroyuki Shiba, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/650,354

(22) PCT Filed: Sep. 25, 2018

(86) PCT No.: PCT/JP2018/035534
§ 371 (c)(1),
(2) Date: Mar. 24, 2020

(87) PCT Pub. No.: WO2019/059405
PCT Pub. Date: Mar. 28, 2019

(65) Prior Publication Data
US 2020/0304180 A1   Sep. 24, 2020

(30) Foreign Application Priority Data
Sep. 25, 2017 (JP) ................................ 2017-183848

(51) Int. Cl.
*H04B 7/02* (2018.01)
*H04B 7/0456* (2017.01)
(Continued)

(52) U.S. Cl.
CPC ....... *H04B 7/0456* (2013.01); *H04L 25/0202* (2013.01); *H04L 27/2605* (2013.01)

(58) Field of Classification Search
CPC .............. H04B 7/0456; H04L 27/2605; H04L 25/0202
(Continued)

(56) References Cited

FOREIGN PATENT DOCUMENTS

WO   WO-2016148262 A1   9/2016

OTHER PUBLICATIONS

Zhang et al, "Orbital Angular Momentum-Based Communications With Partial Arc Sampling Receiving", IEEE Communications Letters, vol. 20, No. 7, Jul. 2016. (Year: 2016).*
(Continued)

*Primary Examiner* — Don N Vo
(74) *Attorney, Agent, or Firm* — Harness, Dickey & Pierce, P.L.C.

(57) ABSTRACT

An OAM multiplexing transmission device includes a unit generating each of the transmission streams in a baseband (BB), in which a channel estimation signal sequence is disposed before a transmission target data signal sequence, and a CP having a predetermined length is disposed in the first half of the channel estimation signal sequence, the channel estimation signal sequence is time-shifted with a channel estimation signal sequence (a basic channel estimation signal sequence) having a predetermined length and a zero correlation, by a predetermined shift value for each of the transmission streams; a unit converting a baseband signal sequence of the generated transmission streams to frequency conversion into RF band, or converting into IF
(Continued)

band and then converting into the RF band; and a unit converting a plurality of the frequency-converted transmission streams into a plurality of OAM mode signals having different orders, and multiplexing spatially by using the UCA.

8 Claims, 10 Drawing Sheets

(51) Int. Cl.
  *H04L 25/02* (2006.01)
  *H04L 27/26* (2006.01)
(58) Field of Classification Search
  USPC .......................................................... 375/267
  See application file for complete search history.

(56) References Cited

OTHER PUBLICATIONS

Wei et al, "Generation of Radio Orbital Angular Momentum (OAM) Waves With Circular Metallic Waveguide", Institute of Electronics and Telecommunications of Rennes (IETR), University of Rennes 1, Rennes, France; Laser Physics Laboratory (LPL), University of Rennes 1, Rennes, France. 2015. (Year: 2015).*

J. Wang et al., "Terabit free-space data transmission employing orbital angular momentum multiplexing", Nature Photonics, vol. 6, pp. 488-pp. 496, Jul. 2012.

Y. Yan et al., "High-capacity millimetre-wave communications with orbital angular momentum multiplexing", Nature Communications, 5:4876, Sep. 16, 2014.

Zhang, Weite et al., "Multi-OAM-mode Microwave Communication with the Partial Arc Sampling Receiving Scheme", 2016 IEEE MTT-S International Microwave Symposium (IMS), May 27, 2016.

Edfors, Ove et al., "Is Orbital Angular Momentum (OAM) Based Radio Communication an Unexploited Area?", IEEE Transactions on Antennas and Propagation, Feb. 2012, vol. 60, issue: 2, pp. 1126-1131.

Yuan, Yuqing et al., "Capacity analysis of UCA-based OAM multiplexing communication system", 2015 International Conference on Wireless Communications & Signal Processing (WCSP), Oct. 17, 2015.

International Search Report (English and Japanese) issued in JP/2018/035534, dated Dec. 18, 2018; ISA/JP.

* cited by examiner

F I G. 7
(1) GENERATE SIGNAL IN OAM MODE 0
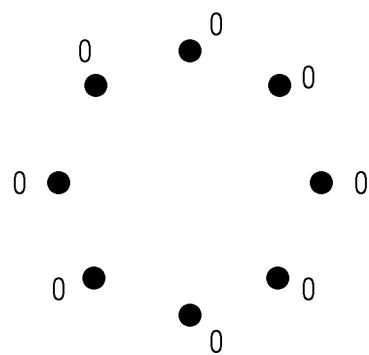
(2) GENERATE SIGNAL IN OAM MODE 1
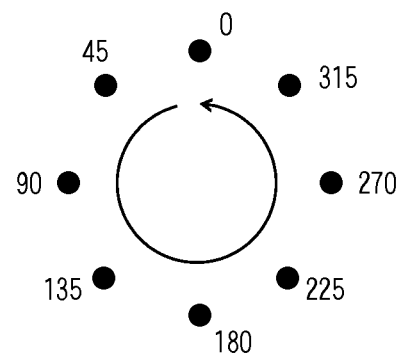
(3) GENERATE SIGNAL IN OAM MODE 2
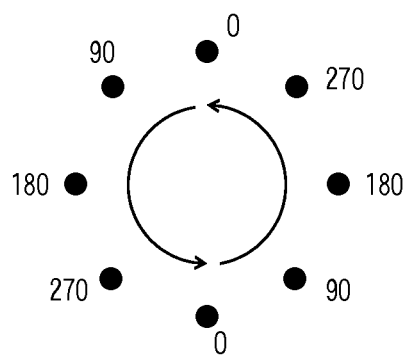
(4) GENERATE SIGNAL IN OAM MODE 3
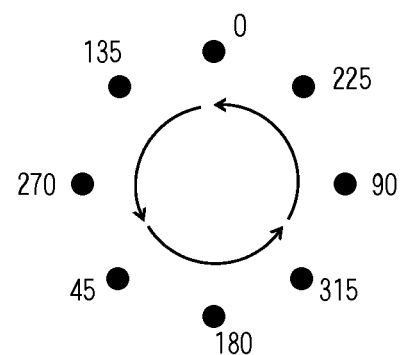

F I G. 8
(1) OAM MODE 1
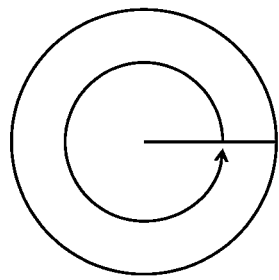
1 ROTATION (360°)
(2) OAM MODE 2
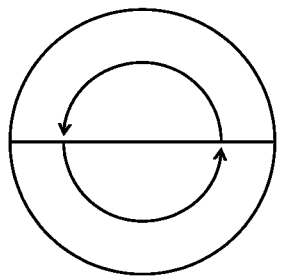
2 ROTATIONS (720°)
(3)
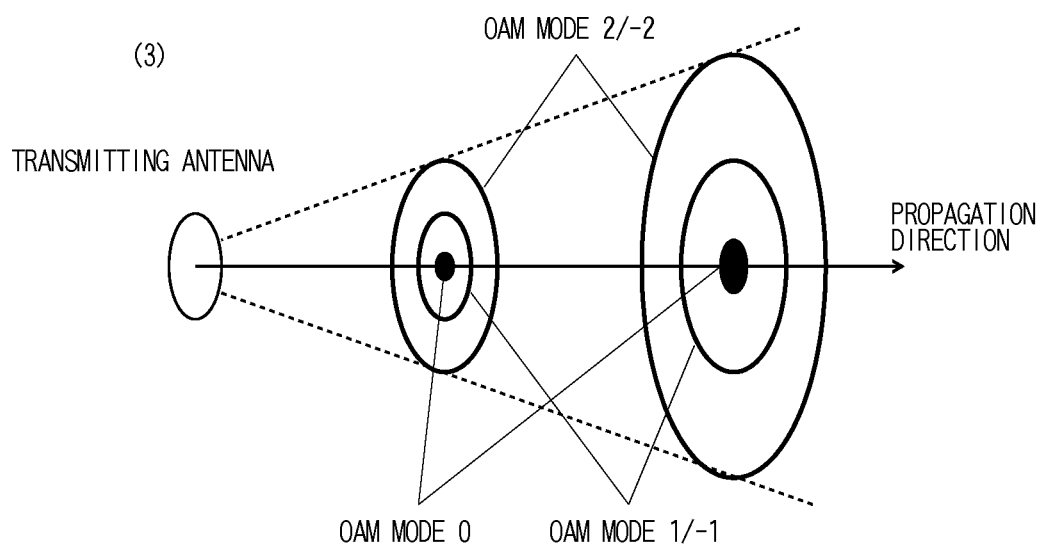

(1) DEMULTIPLEX SIGNAL IN OAM MODE 0

(2) DEMULTIPLEX SIGNAL IN OAM MODE 1

(3) DEMULTIPLEX SIGNAL IN OAM MODE 2

(4) DEMULTIPLEX SIGNAL IN OAM MODE 3

OAM MULTIPLEXING COMMUNICATION SYSTEM, OAM MULTIPLEXING TRANSMISSION DEVICE, OAM MULTIPLEXING RECEIVING DEVICE, AND OAM MULTIPLEXING COMMUNICATION METHOD

CROSS REFERENCE TO RELATED APPLICATION

This application is a U.S. National Stage application claiming the benefit of prior filed International Application Number PCT/JP2018/035534, filed on Sep. 25, 2018, in which the International Application claims priority from Japanese Patent Application Number 2017-183848, filed on Sep. 25, 2017, the entire contents of which are incorporated herein by reference.

TECHNICAL FIELD

The present invention relates to an OAM multiplexing communication system, an OAM multiplexing transmission device, an OAM multiplexing reception device, and an OAM multiplexing communication method of subjecting a radio signal to spatial multiplex transmission by using orbital angular momentum (OAM) of an electromagnetic wave.

BACKGROUND ART

In recent years, in order to improve a transmission capacity, a spatial multiplex transmission technique for a radio signal using OAM has been reported (Non-Patent Document 1). In an electromagnetic wave having OAM, an equiphase surface thereof is distributed in a spiral form along a propagation direction centering a propagation axis. Since electromagnetic waves in different OAM modes and propagating in the same direction have spatial phase distributions orthogonal to each other, respective signals in OAM modes modulated with different signal sequences are demultiplexed in a receiving station, and thus the signals can be subjected to multiplex transmission.

In a wireless communication system using the OAM multiplexing technique, a plurality of OAM modes are generated and combined with each other by using a uniform circular array (UCA) in which a plurality of antenna elements are disposed circularly at an equal interval, to be transmitted, and thus spatial multiplex transmission of different signal sequences is performed (Non-Patent Document 2).

FIG. 7 illustrates a phase setting example of a UCA for generating a signal in an OAM mode. In FIG. 7, signals in OAM modes 0, 1, 2, 3, . . . on a transmission side are generated based on phase differences among antenna elements (indicated by •) of the UCA. In other words, a signal in an OAM mode n is generated by setting a phase of each antenna element such that a phase of the UCA is n rotations (n×360 degrees). For example, if a UCA including eight antenna elements generates a signal in the OAM mode n=2, as illustrated in (3) of FIG. 7, a phase difference of 360n/m=90 degrees (0 degrees, 90 degrees, 180 degrees, 270 degrees, 0 degrees, 90 degrees, 180 degrees, and 270 degrees) is set among the antenna elements counterclockwise such that a phase is two rotations. A signal rotated reversely to a signal in the OAM mode n is in an OAM mode −n. For example, a rotational direction of a phase of a signal in a positive OAM mode is a counterclockwise direction, and a rotational direction of a phase of a signal in a negative OAM mode is a clockwise direction.

Different signal sequences are generated as signals in different OAM modes, and the generated signals are simultaneously transmitted such that wireless communication using spatial multiplex can be performed. On a transmission side, signals to be transmitted in respective OAM modes are generated and combined in advance, the combined signals in the respective OAM modes may be transmitted from a single UCA, and signals in respective OAM modes may be transmitted from different UCAs for the respective OAM modes by using a plurality of UCAs.

FIG. 8 illustrates examples of a phase distribution and a signal intensity distribution of an OAM multiplexing signal. In (1) and (2) of FIG. 8, phase distributions of signals in the OAM mode 1 and the OAM mode 2, viewed at an end surface (propagation orthogonal plane) orthogonal to a propagation direction from a transmission side, are indicated by arrows. A start point of the arrow is 0 degrees, a phase linearly changes, and an end point of the arrow is 360 degrees. In other words, a signal in the OAM mode n propagates while a phase thereof is n rotations (n×360 degrees) on the propagation orthogonal plane. Arrows of phase distributions of signals in the OAM modes −1 and −2 rotate reversely.

Signals in respective OAM modes are different in terms of a signal intensity distribution and a position where a signal intensity is the maximum for each OAM mode. However, intensity distributions in identical OAM modes having different signs are the same as each other. Specifically, as an OAM mode becomes a higher-order mode, a position where a signal intensity is the maximum becomes more distant from the propagation axis (Non-Patent Document 2). Here, an OAM mode with a greater value will be referred to as a higher-order mode. For example, a signal in the OAM mode 3 is a signal in a higher-order mode than signals in the OAM mode 0, the OAM mode 1, and the OAM mode 2.

In (3) of FIG. 8, a position where a signal intensity is the maximum for each OAM mode is indicated by a circular ring, but, as an OAM mode becomes a higher-order mode, the position where the signal intensity is the maximum becomes more distant from the central axis, and a beam diameter of an OAM mode multiplex signal increases according to a propagation distance such that the circular ring indicating the position where the signal intensity is the maximum becomes large.

FIG. 9 illustrates a phase setting example of a UCA for demultiplexing an OAM multiplexing signal. In FIG. 9, on a reception side, a phase of each antenna element of the UCA is set to be reverse to a phase of an antenna element on a transmission side, and a signal in each OAM mode is demultiplexed. In other words, phases of the respective antenna elements are set to rotate reversely to the case illustrated in FIG. 7. For example, when a signal in the OAM mode 2 is demultiplexed, a phase difference (0 degrees, 90 degrees, 180 degrees, 270 degrees, 0 degrees, 90 degrees, 180 degrees, and 270 degrees) of 90 degrees is set among the respective antenna elements clockwise such that a phase is two rotations.

Regarding the demultiplexing process on the reception side, signals in respective OAM modes may be collectively received by using a single UCA and are then demultiplexed, and a signal in an OAM mode different for each UCA may be received by using a plurality of UCAs.

Non-Patent Document 1: J. Wang et al., "Terabit free-space data transmission employing orbital angular momentum multiplexing", Nature Photonics, Vol. 6, pp. 488 to 496, July 2012.

Non-Patent Document 2: Y. Yan et al., "High-capacity millimetre-wave communications with orbital angular momentum multiplexing", Nature Communications, vol. 5, p. 4876, September 2014.

DISCLOSURE

Problems to be Solved

In OAM multiplexing communication, signals in a plurality of OAM modes are spatially multiplexed with a single UCA or signals in an identical OAM mode are spatially multiplexed with a plurality of UCAs such that a multiplex number is increased, and thus it is possible to improve a transmission capacity. In the OAM multiplexing communication, demultiplexing of a signal in each OAM mode transmitted from the single UCA is performed by the configuration illustrated in FIG. 9, but a channel estimation signal is used to demultiplex an individual signal (hereinafter, referred to as a stream) from the signals in the identical OAM mode transmitted from the plurality of UCAs. Since the channel estimation signal is a known signal to a transmission device and a reception device and is used for channel estimation, if an overhead of the channel estimation signal increases, a transmission capacity of data desired to be actually sent deteriorates.

FIG. 10 illustrates a transmission form of a channel estimation signal of the related art. In FIG. 10, in respective transmission streams, each channel estimation signal is sequentially transmitted, and a channel estimation signal of a self-stream is not transmitted for transmission times of channel estimation signals of other streams. Data signals of all the streams are simultaneously transmitted. Transmission of the channel estimation signals and the data signals is repeated, and thus communication is performed while estimating a channel. Although not illustrated in FIG. 10, a control signal such as a synchronization signal is sequentially transmitted in each stream or is simultaneously transmitted in all streams. The present invention targets not the control signal but the channel estimation signal and an estimation process. In the method of the related art illustrated in FIG. 10, there is a problem in that an overhead of a channel estimation signal increases when a multiplex number increases.

FIG. 11 illustrates a channel estimation process example of the related art. Here, the number of UCAs may be one or plural. In FIG. 11, a receiving antenna unit and an RF unit of an OAM multiplexing reception device include an antenna configuration and a phase converter for OAM reception, a band limiting filter, a down converter, a low noise amplifier, and the like, but, herein, a channel estimation process after digital conversion of a received signal in a digital signal processing unit is handled, and thus details of the receiving antenna unit and the RF unit of the OAM multiplexing reception device are omitted.

An analog-digital converter (ADC) samples outputs from the receiving antenna unit and the RF unit of the OAM multiplexing reception device into digital signals. Here, in the method of the related art, channel estimation for all transmission streams is performed on signals of all sampled reception streams, and thus there is a problem in that a calculation amount required for the channel estimation increases when a multiplex number increases.

As mentioned above, when a multiplex number increases, design of a channel estimation signal suitable for OAM multiplexing communication and a channel estimation method using the channel estimation signal are necessary. When OAM multiplexing communication is performed in a broadband, in a case where the OAM multiplexing communication is performed by dividing a band into multiple bands, design of a channel estimation signal and a channel estimation method using the channel estimation signal are also necessary.

After a channel estimation process is performed by using a channel estimation signal, an equalization process on data signals of each stream is performed, and thus a demodulation process is performed. Details of the equalization process or the demodulation process are not described, but a generally used equalization method such as a zero forcing (ZF) method or a minimum mean square error (MMSE) method, and a demodulation method generally used in a wireless communication system, such as maximum likelihood decoding (MLD), minimum distance decoding (MDD), or a Viterbi decoder (VD), are supposed. Channel coding and decoding processes are also supposed.

A proposition of the present invention is to provide an OAM multiplexing communication system, an OAM multiplexing transmission device, an OAM multiplexing reception device, and an OAM multiplexing communication method of providing a channel estimation signal generation method in which an overhead of a channel estimation signal does not increases even though a multiplex number increases in a wireless communication system using OAM multiplexing transmission, and a low-load channel estimation processing method using the channel estimation signal.

Means for Solving the Problems

An OAM multiplexing transmission device of the present embodiment sets a single channel estimation signal sequence in each transmission stream to be subjected to OAM multiplexing transmission through time shift, and simultaneously transmits channel estimation signal sequences that are input through the time shift in each transmission stream. Here, as the channel estimation signal sequence, a signal sequence such as a Golay code having a zero correlation is used. A time shift amount in each transmission stream is set to be a time longer than a time of a channel response. A value of the time shift is set to be greater than the maximum value of channel responses of all transmission streams.

In order to reduce a calculation amount in an OAM multiplexing reception device, a part of the second half of the channel estimation signal sequence of each transmission stream is attached to the first half of the channel estimation signal sequence as a cyclic prefix (CP). The CP is set to be longer than channel responses of respective transmission streams. Consequently, even though channel estimation signal sequences of respective transmission streams are simultaneously transmitted, a reception side can estimate a channel of each transmission stream, and thus it is possible to reduce an overhead of a channel estimation signal.

Since a transmission side simultaneously transmits channel estimation signal sequences, the channel estimation signal sequences of all transmission streams of the transmission side are simultaneously received in an output of each reception stream of a reception side. A CP that is longer than a channel response is added to a channel estimation signal sequence, and thus an output of each reception stream is represented by a circulant matrix. The circulant matrix has a feature of being decomposed into multiplication of discrete Fourier transform (DFT), a diagonal matrix, and inverse discrete Fourier transform (IDFT). A signal sequence such as a Golay code having a zero correlation has a feature that a correlation is zero with respect to time shift, and channel responses from all transmission streams to each reception stream can be subjected to channel estimation in a batch by using a feature that each transmission stream is generated through time shift of a single signal sequence having a zero correlation, the time shift being longer than a channel response.

When a band is divided into multiple bands, and OAM multiplexing transmission is performed, the problem can be solved by the same solving means even though the number of decomposition bands increases.

Effect

According to the present invention, it is possible to realize a channel estimation signal generation method in which an overhead of a channel estimation signal does not increase even though a multiplex number increases in an OAM multiplexing transmission system, and a low-load channel estimation processing using the channel estimation signal, and thus to reduce a calculation amount for the channel estimation process while reducing the overhead of the channel estimation signal. When OAM communication is performed by dividing a band into multiple bands, the same effect can be achieved even though the number of decomposition bands increases.

BRIEF DESCRIPTION OF THE DRAWINGS

FIG. 7 is a diagram illustrating a phase setting example of a UCA for generating a signal in an OAM mode.

FIG. 8 is a diagram illustrating examples of a phase distribution and a signal intensity distribution of an OAM multiplexing signal.

DETAILED DESCRIPTION OF THE EMBODIMENTS

In Examples described below, it is assumed that each of the centers of a UCA of a transmitting antenna and a UCA of a receiving antenna are matched with a propagation direction by using GPS information or other measurement methods, and each UCA is disposed on a propagation orthogonal plane.

Figure 1:
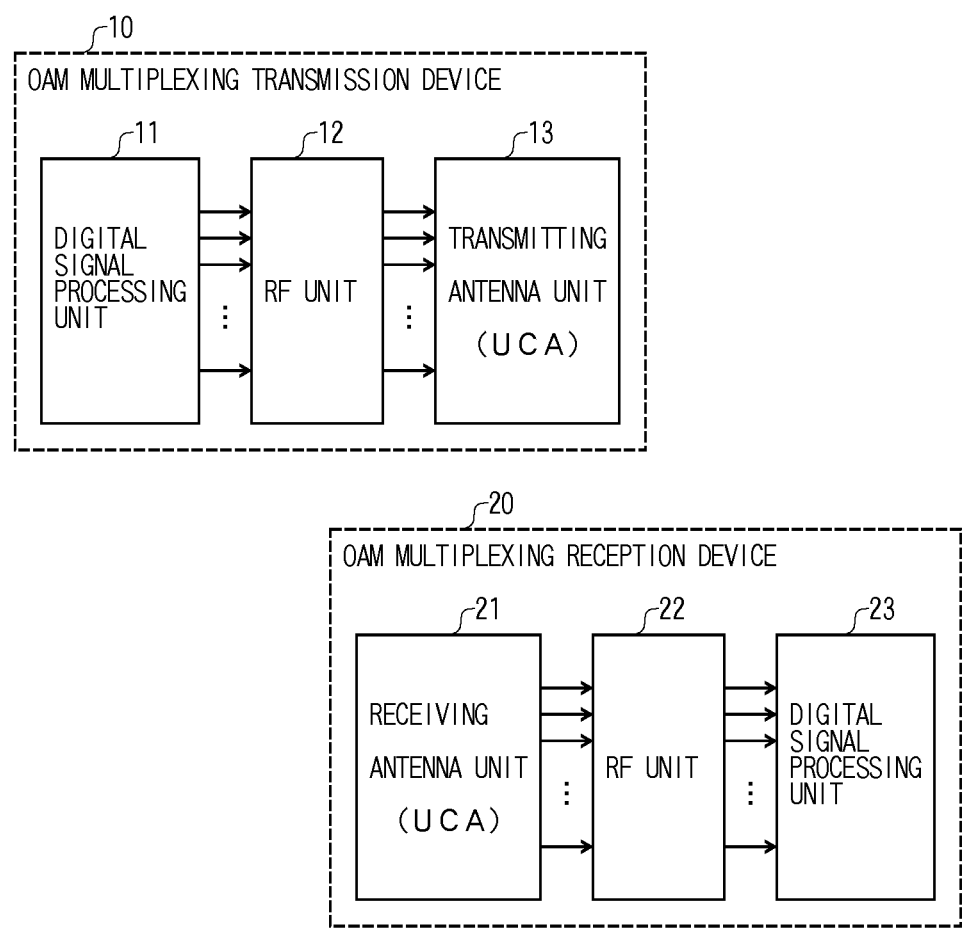
FIG. 1 is a diagram illustrating a schematic configuration of OAM multiplexing transmission and reception devices of the present invention.

FIG. 1 illustrates a schematic configuration of OAM multiplexing transmission and reception devices of the present invention. In FIG. 1, an OAM multiplexing transmission device 10 includes a digital signal processing unit 11, an RF unit 12, and a transmitting antenna unit 13. The digital signal processing unit 11 performs digital signal processing required for communication of data modulation or stream generation. The RF unit 12 performs analog processes such as frequency conversion and RF filtering. The transmitting antenna unit 13 transmits a plurality of streams by using the UCA. An OAM multiplexing reception device 20 includes a receiving antenna unit 21, an RF unit 22, and a digital signal processing unit 23. The receiving antenna unit 21 receives signals in a plurality of OAM modes by using the UCA. The RF unit 22 performs analog processes such as frequency conversion and RF filtering. The digital signal processing unit 23 performs a demultiplexing process on multiplexed streams through an equalization process using a ZF or a MMSE method. When channel estimation is performed, the digital signal processing unit 11 of the OAM multiplexing transmission device 10 generates and transmits a known signal, and the digital signal processing unit 23 of the OAM multiplexing reception device 20 performs the channel estimation by using information regarding the known signal.

Example 1

Figure 2:
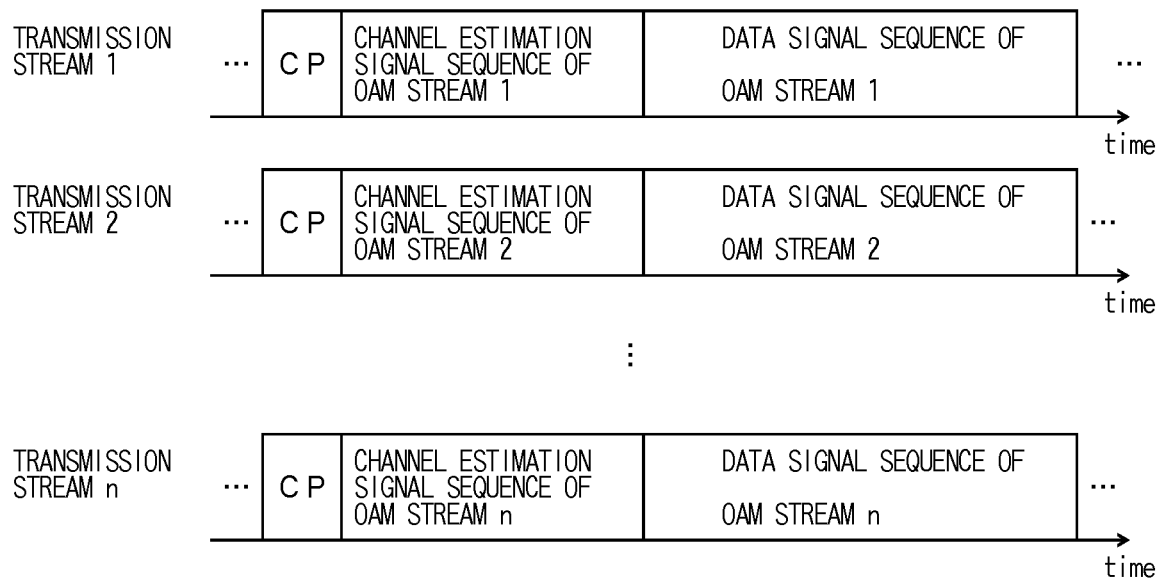
FIG. 2 is a diagram illustrating a generation example of a channel estimation signal in Example 1 of the present invention.

FIG. 2 illustrates a generation example of a channel estimation signal in Example 1 of the present invention. In FIG. 2, channel estimation signals of respective streams are simultaneously transmitted. In each stream, a channel estimation signal sequence and a data signal sequence are consecutively transmitted in a time domain. Although not illustrated, a control signal such as a synchronization signal defined in a wireless communication standard is consecutively transmitted in the time domain. A part of a second half of the channel estimation signal sequence of each stream is attached to a first half of the channel estimation signal sequence as a cyclic prefix (CP), and is transmitted. The CP is set to be more than the largest length among lengths of channel responses of the respective streams.

A signal sequence (hereinafter, referred to as a basic channel estimation signal sequence) having a single zero correlation is subjected to time shift and is used as the channel estimation signal sequence of each stream. The time shift here indicates circulant time shift. A value of the time shift is set to be more than the largest length among lengths of channel responses of the respective streams. As the channel estimation signal sequence, a signal sequence that is more than a value obtained by multiplying the number of multiplexed streams by a value of the time shift is used. When a signal sequence having a length of a power of 2, such as a Golay signal is used as a channel estimation signal sequence, a signal sequence having a length of a power of 2 greater than a value obtained by multiplying the number of multiplexed streams by a value of time shift is used. Here, a length of a channel response of each stream may be measured according to a method other than the present invention, and may employ a value set in advance. The number of multiplexed streams, the type and a length of channel estimation signal sequence, and a value of time shift are assumed to be known in transmission and reception. These values may be transferred from a transmission side to a reception side by using the control signal, and may be supposed to be known to both of the transmission side and the reception side as known values set in advance.

(Example 1 of Transmission Stream)

When the number of multiplexed streams is four, a value of time shift is 2, a length of a basic channel estimation signal sequence is 8 (c1, c2, c3, c4, c5, c6, c7, c8), and a length of a CP is 3, channel estimation signal sequences of respective streams are as follows. An underline part indicates the CP.

A channel estimation signal sequence of a transmission stream 1:

(c6, c7, c8, c1, c2, c3, c4, c5, c6, c7, c8)

A channel estimation signal sequence of a transmission stream 2:

(c4, c5, c6, c7, c8, c1, c2, c3, c4, c5, c6)

A channel estimation signal sequence of a transmission stream 3:

(c2, c3, c4, c5, c6, c7, c8, c1, c2, c3, c4)

A channel estimation signal sequence of a transmission stream 4:

(c8, c1, c2, c3, c4, c5, c6, c7, c8, c1, c2)

Figure 3:
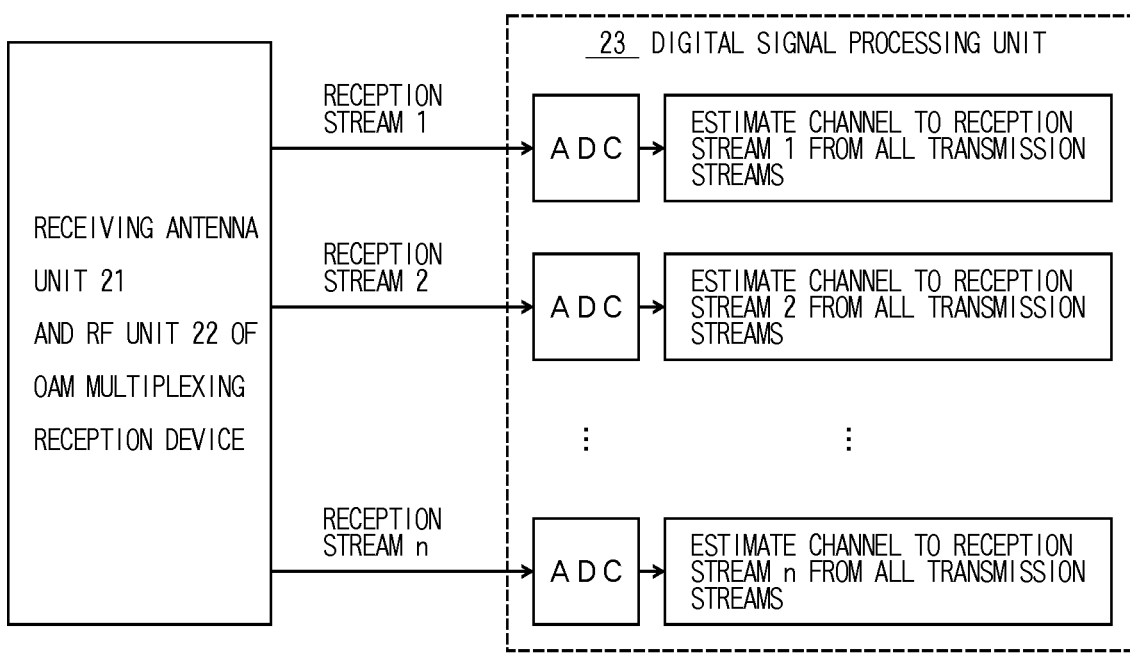
FIG. 3 is a diagram illustrating a channel estimation process example in Example 1 of the present invention.

FIG. 3 illustrates a channel estimation process example in Example 1 of the present invention. In FIG. 3, operations of the receiving antenna unit 21, the RF unit 22, and the ADC of the digital signal processing unit 23 of the OAM multiplexing reception device are the same as those of the configuration of the related art. The feature of the channel estimation process in the present invention is that channel estimation is performed in a batch from all transmission streams to each reception stream. Consequently, it is possible to reduce a calculation amount required for channel estimation compared with the method of the related art in which channel estimation is performed for each transmission stream. When a transmission side transmits a signal sequence having a zero correlation as a channel estimation signal sequence of each transmission stream while time-shifting the signal sequence, each reception stream subjected to an ADC process can be expressed as a circulant matrix. Therefore, it is possible to further reduce a calculation amount by using discrete Fourier transform (DFT) and inverse discrete Fourier transform (IDFT).

Next, in a case of the example of a transmission stream, a description will be made of a received signal of a reception stream 1 being expressed as a circulant matrix. Hereinafter, an example of the reception stream 1 will be described, but other reception streams may also be expressed as circulant matrixes. Here, a length of a channel response from a transmission stream i(xi) to a reception stream j(yj) is supposed to be a single time sampling length, and is represented by hij(hij(0),hij(1)). N indicates a noise component.

$$y1 = x1 * h11 + x2 * h21 + x3 * h31 + x4 * h41 + N \quad (1)$$

Here, * indicates convolution. The convolution may be expressed as matrix calculation, and thus Equation (1) may be represented by matrix calculation as in Equation (2).

$$\begin{bmatrix} y1(1) \\ y1(2) \\ y1(3) \\ y1(4) \\ \vdots \\ y1(11) \end{bmatrix} = \begin{bmatrix} c6 & 0 \\ c7 & c6 \\ c8 & c7 \\ c1 & c8 \\ \vdots & \vdots \\ c8 & c7 \end{bmatrix} x \begin{bmatrix} h11(0) \\ h11(1) \end{bmatrix} + \begin{bmatrix} c4 & 0 \\ c5 & c4 \\ c6 & c5 \\ c7 & c6 \\ \vdots & \vdots \\ c6 & c5 \end{bmatrix} x \begin{bmatrix} h21(0) \\ h21(1) \end{bmatrix} + \quad (2)$$

$$\begin{bmatrix} c2 & 0 \\ c3 & c2 \\ c4 & c3 \\ c5 & c4 \\ \vdots & \vdots \\ c4 & c3 \end{bmatrix} x \begin{bmatrix} h31(0) \\ h31(1) \end{bmatrix} + \begin{bmatrix} c8 & 0 \\ c1 & c8 \\ c2 & c1 \\ c3 & c2 \\ \vdots & \vdots \\ c2 & c1 \end{bmatrix} x \begin{bmatrix} h41(0) \\ h41(1) \end{bmatrix} + \begin{bmatrix} n(1) \\ n(2) \\ n(3) \\ n(4) \\ \vdots \\ n(11) \end{bmatrix}$$

Here, y1(k) and n(k) in Equation (2) respectively indicate a k-th signal and a k-th noise component in the time domain after an ADC process on y1.

Equation (2) may be represented by a single matrix as in Equation (3) by using the feature that a channel estimation signal is obtained by time-shifting an identical basic channel estimation signal.

$$\begin{bmatrix} y1(1) \\ y1(2) \\ y1(3) \\ y1(4) \\ \vdots \\ y1(11) \end{bmatrix} = \begin{bmatrix} c6 & 0 & c4 & 0 & c2 & 0 & c8 & 0 \\ c7 & c6 & c5 & c4 & c3 & c2 & c1 & c8 \\ c8 & c7 & c6 & c5 & c4 & c3 & c2 & c1 \\ c1 & c8 & c7 & c6 & c5 & c4 & c3 & c2 \\ \vdots & \vdots & \vdots & \vdots & \vdots & \vdots & \vdots & \vdots \\ c8 & c7 & c6 & c5 & c4 & c3 & c2 & c1 \end{bmatrix} x \begin{bmatrix} h11(0) \\ h11(1) \\ h21(0) \\ h21(1) \\ h31(0) \\ h31(1) \\ h41(0) \\ h41(1) \end{bmatrix} + \begin{bmatrix} n(1) \\ n(2) \\ n(3) \\ n(4) \\ \vdots \\ n(11) \end{bmatrix} \quad (3)$$

Here, y1(1), y1(2), and y1(3) are signals corresponding to a CP, and thus are not used, and, if only y1(4) to y1(11) are used, Equation (4) is obtained.

$$\begin{bmatrix} y1(4) \\ y1(5) \\ \vdots \\ y1(11) \end{bmatrix} = \begin{bmatrix} c1 & c8 & c7 & c6 & c5 & c4 & c3 & c2 \\ c2 & c1 & c8 & c7 & c6 & c5 & c4 & c3 \\ \vdots & \vdots & \vdots & \vdots & \vdots & \vdots & \vdots & \vdots \\ c8 & c7 & c6 & c5 & c4 & c3 & c2 & c1 \end{bmatrix} x \begin{bmatrix} h11(0) \\ h11(1) \\ h21(0) \\ h21(1) \\ h31(0) \\ h31(1) \\ h41(0) \\ h41(1) \end{bmatrix} + \begin{bmatrix} n(4) \\ n(5) \\ \vdots \\ n(11) \end{bmatrix} \quad (4)$$

Here, the first matrix of the right term of Equation (4) is a circulant matrix. The circulant matrix is a channel estimation signal sequence and is thus known to the transmission side and the reception side. Therefore, the reception side may estimate an unknown channel by using the known circulant matrix and signals of each stream after an ADC process. Particularly, in the present invention, as represented in Equation (4), channel responses from all streams of the transmission side to each reception stream can be estimated in a batch.

Next, a description will be made of a channel estimation method using the feature that a circulant matrix is decomposed into a DFT matrix, a diagonal matrix, and an IDFT matrix. First, Equation (4) is represented by Equation (5).

$$\begin{bmatrix} y1(4) \\ y1(5) \\ \vdots \\ y1(11) \end{bmatrix} = \begin{bmatrix} DFT \\ (8x8) \end{bmatrix} \quad (5)$$

-continued $$x \begin{bmatrix} C1 & 0 & \cdots & 0 \\ 0 & C2 & \cdots & 0 \\ \vdots & \vdots & \ddots & \vdots \\ 0 & 0 & \cdots & C8 \end{bmatrix} x \begin{bmatrix} IDFT \\ (8 \times 8) \end{bmatrix} x \begin{bmatrix} h11(0) \\ h11(1) \\ h21(0) \\ h21(1) \\ h31(0) \\ h31(1) \\ h41(0) \\ h41(1) \end{bmatrix} + \begin{bmatrix} n(4) \\ n(5) \\ \vdots \\ n(11) \end{bmatrix}$$

Here, DFT (8×8) and IDFT (8×8) respectively indicate a DFT matrix and an IDFT matrix of 8 points. In addition, C1, C2, ..., and C8 are values obtained by performing a DFT process on the basic channel signal sequence (c1, c2, ..., c8), and are thus known to the reception side. Since the circulant matrix is decomposed in Equation (5), if a DFT process, inverse matrix calculation of a diagonal matrix, and an IDFT process are performed on the column vector of [y1(4),y1(5), ..., y1(11)], channel estimation from all of the transmission streams to the reception stream 1 is possible in a batch.

Calculation amounts of the DFT process and the IDFT process are 0 (n log n), and the inverse matrix calculation of a diagonal matrix is multiplication of scalar values and is thus 0 (n). This is smaller than 0 (n3) that is a calculation amount for inverse matrix calculation. Here, n is a size of a matrix (the number of rows).

As mentioned above, according to the present invention, it is possible to considerably reduce a calculation amount required for channel estimation. The description relates to a simple example, but may also be applied to cases of taking general values in the same manner.

Example 2

Example 2 solves a problem that an overhead of a channel estimation signal increases due to an increase in the number of decomposition bands, and a calculation amount required for channel estimation increases, when OAM multiplexing communication is performed in the decomposition bands resulting from dividing a band into multiple bands.

Figure 4:
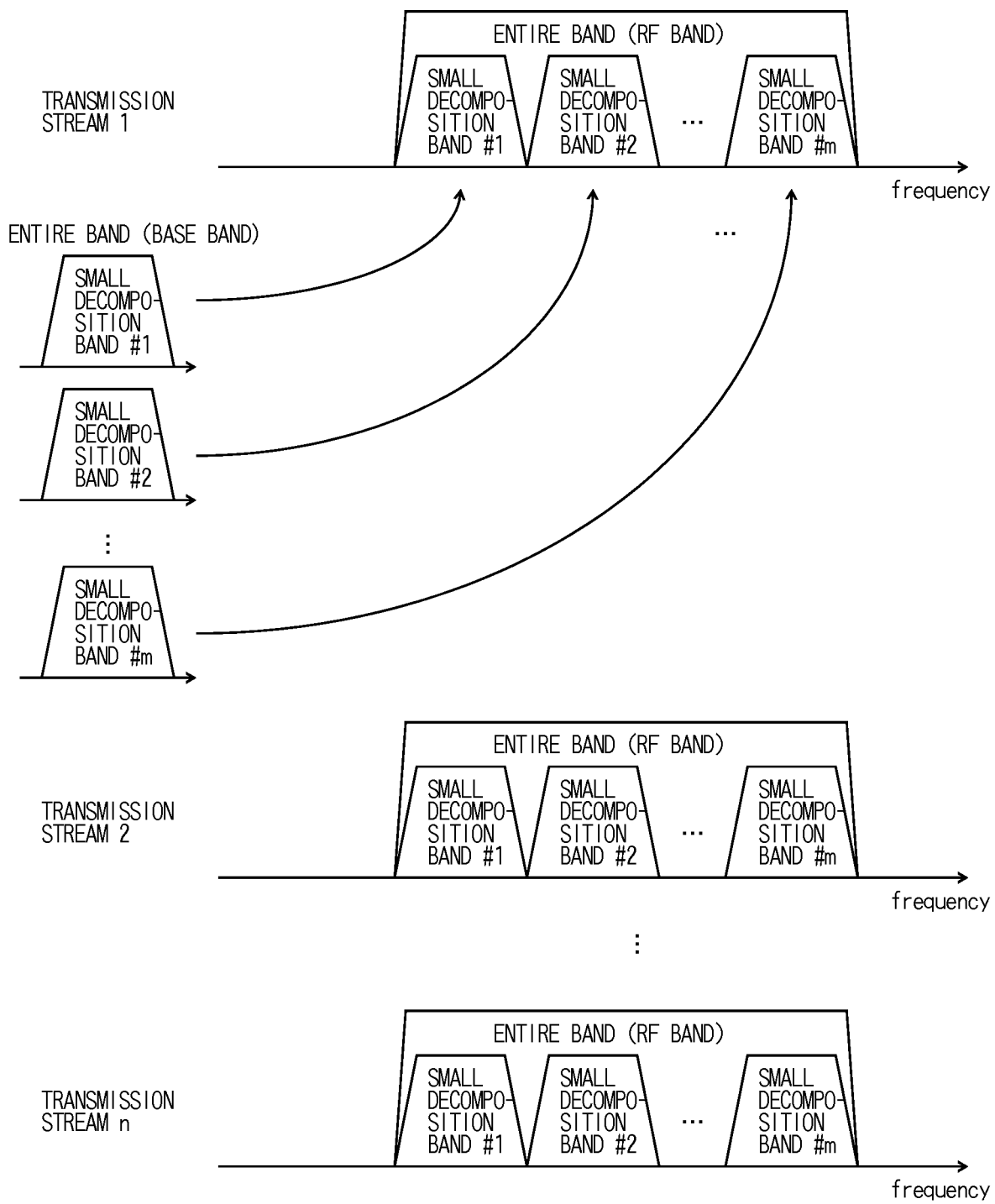
FIG. 4 is a diagram illustrating an example of performing OAM multiplexing communication through division of a band according to the present invention.

FIG. 4 illustrates an example in which OAM multiplexing communication is performed by dividing a band according to the present invention. Herein, a description will be made of a reduction of an overhead of a channel estimation signal sequence and a reduction of a calculation amount for channel estimation when decomposition bands are used.

In FIG. 4, the entire band used for OAM multiplexing communication may be divided into decomposition bands. When OAM multiplexing communication is used at 28 GHz, 60 GHz, 73 GHz, or a frequency higher than that, such a band of a millimeter wave is wider by about 10 times to 100 times than a band of a microwave of 6 GHz or less of the related art, and thus the band is required to be divided and used due to a limit of an ADC rate. For example, when a band of 2 GHz in the 28 GHz band is used in OAM multiplexing communication, if a component such as an ADC capable of coping with 500 MHz or less is used, the band is required to be divided into four decomposition bands and used.

Figure 5:
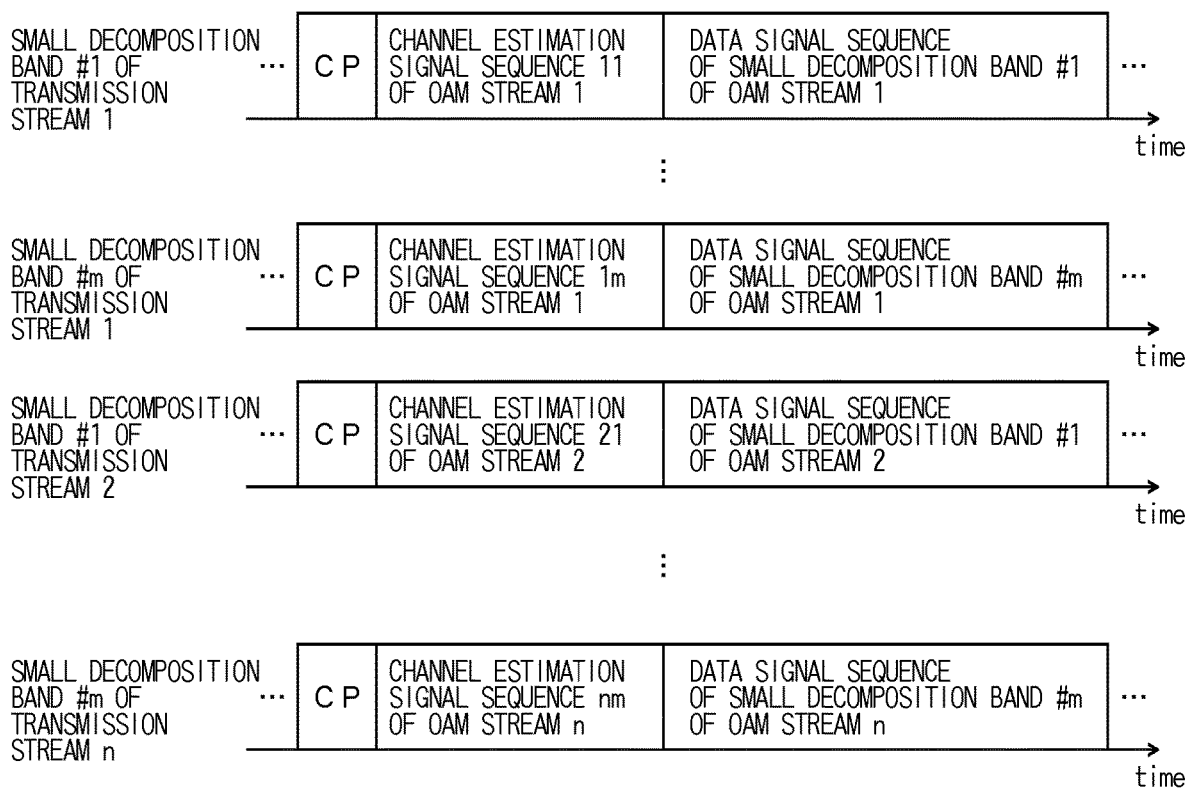
FIG. 5 is a diagram illustrating a generation example of a channel estimation signal sequence in Example 2 of the present invention.

Thus, each transmission stream is formed by using a plurality of m small decomposition bands. In each small decomposition band, signal sequences including a channel estimation signal sequence, a CP thereof, and a data signal sequence are generated in a baseband (BB) as illustrated in FIG. 5 (details thereof will be described later). The signal sequences generated in the above-described way are combined into a signal in an RF band as a small decomposition band as illustrated in FIG. 4, so as to be transmitted.

Here, the signal sequences in the baseband (BB) are supposed to include a control signal due to the need of a communication standard as described in Example 1. A guide interval (GI) may be inserted during combination of respective small decomposition bands in the RF band. For example, when an RF bandwidth (27 to 29 GHz) of 2 GHz is decomposed into four small decomposition bands, and a GI of 100 MHz is inserted for each small decomposition band, a small decomposition band is supposed to be allocated every 425 MHz (=(2000−300)/4). The number of small decomposition bands in patterns other than this example, a band thereof, and setting of a band of a GI are also supposed. Such information is assumed to be known to the transmission and reception sides. For example, the information may be known to the transmission and reception sides by means other than the present invention by using control information or the like, and preset values may be known instead of using control information or the like.

FIG. 4 illustrates an example of so-called direct conversion in which a baseband signal is converted into an RF band signal, but heterodyne-based conversion may be performed in which the baseband signal is combined in an intermediate frequency (IF) band and is then converted into an RF band signal. For example, the baseband signal is combined in 9 to 11 GHz that is an IF band, and a signal in the IF band may be converted into a signal in the RF band (27 to 29 GHz).

FIG. 5 illustrates a generation example of a channel estimation signal sequence in Example 2 of the present invention.

In FIG. 5, a channel estimation signal sequence ij indicates a channel estimation signal sequence of a j-th small decomposition band of an i-th transmission stream. Herein, a single channel estimation signal sequence is used and is subjected to time shift (circulant shift), and is set as a channel estimation signal sequence of each small decomposition band of each transmission stream. A value of the time shift is set to a value more than a length of channel responses of channels of all small decomposition bands of all transmission streams in the same manner as in Example 1. Through the setting, it is possible to prevent interference to each channel in channel estimation. A length of a channel estimation signal sequence is set to a length capable of coping with a channel estimation signal sequence having a zero correlation such as a single Golay code even though a channel estimation signal sequence of each small decomposition band of each transmission stream is set through time shift. For example, when OAM multiplexing communication is performed by dividing each of four transmission streams into three small decomposition bands, and a value of time shift is 2, a channel estimation signal sequence is set to be longer than 4×3×2 (=24). When a length is a power of 2, a value (for example, 32) of a power of 2 more than the length is used.

In the same manner as in Example 1, a CP longer than time shift is attached. As mentioned above, channel estimation signal sequences are set in respective small decomposition bands of respective transmission streams, and are simultaneously transmitted. Consequently, it is not necessary to transmit channel estimation signals at separate times to respective small decomposition bands of respective transmission streams, and thus to considerably reduce an overhead of a channel estimation signal sequence.

Figure 6:
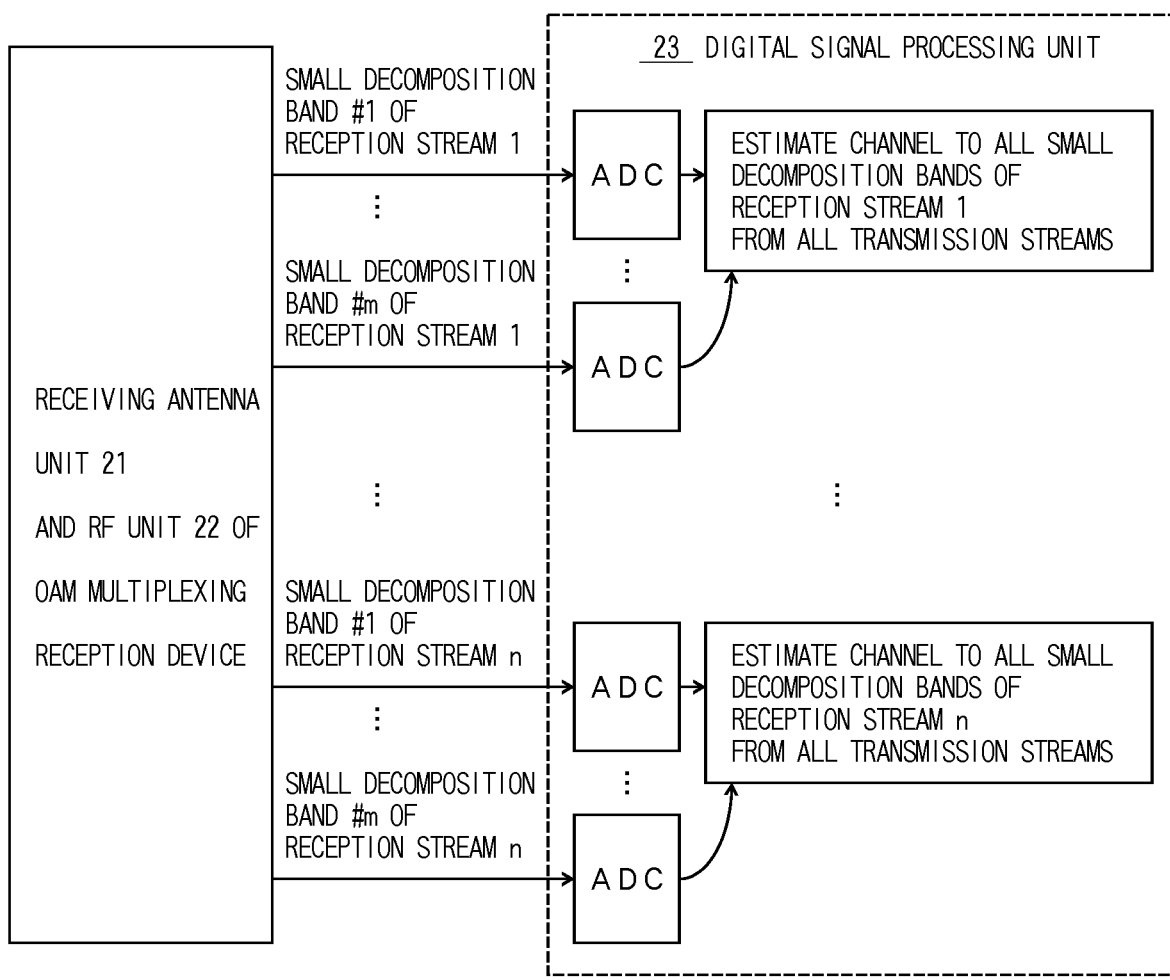
FIG. 6 is a diagram illustrating a channel estimation process example in Example 2 of the present invention.
Figure 9:
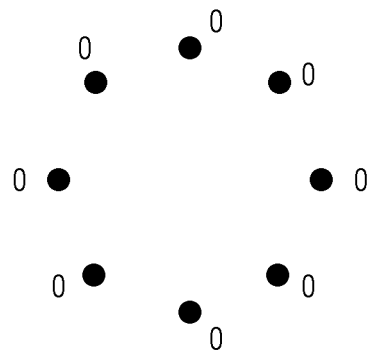
FIG. 9 is a diagram illustrating a phase setting example of a UCA for demultiplexing an OAM multiplexing signal.
Figure 9:
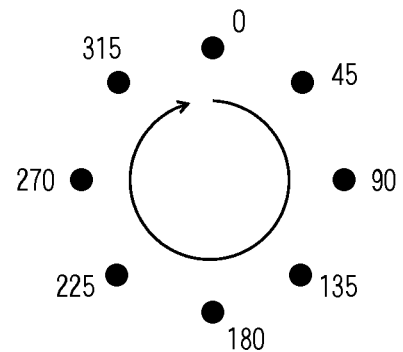
Figure 9:
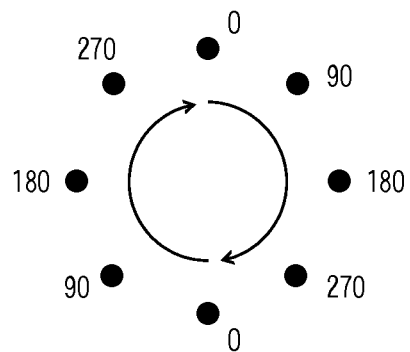
Figure 9:
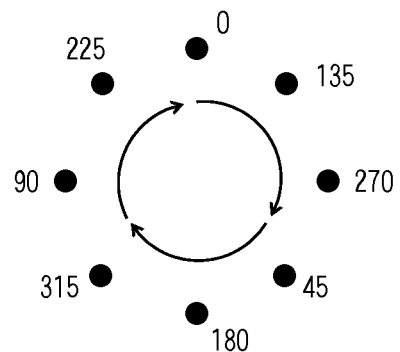
Figure 10:
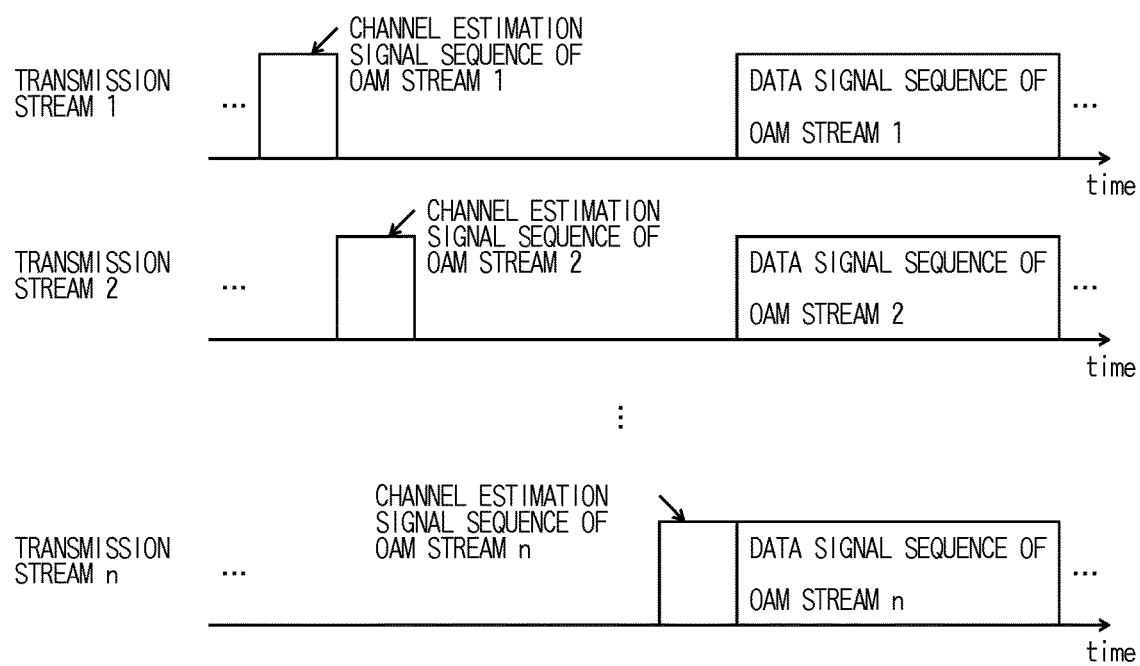
FIG. 10 is a diagram illustrating a transmission form of a channel estimation signal of the related art.
Figure 11:
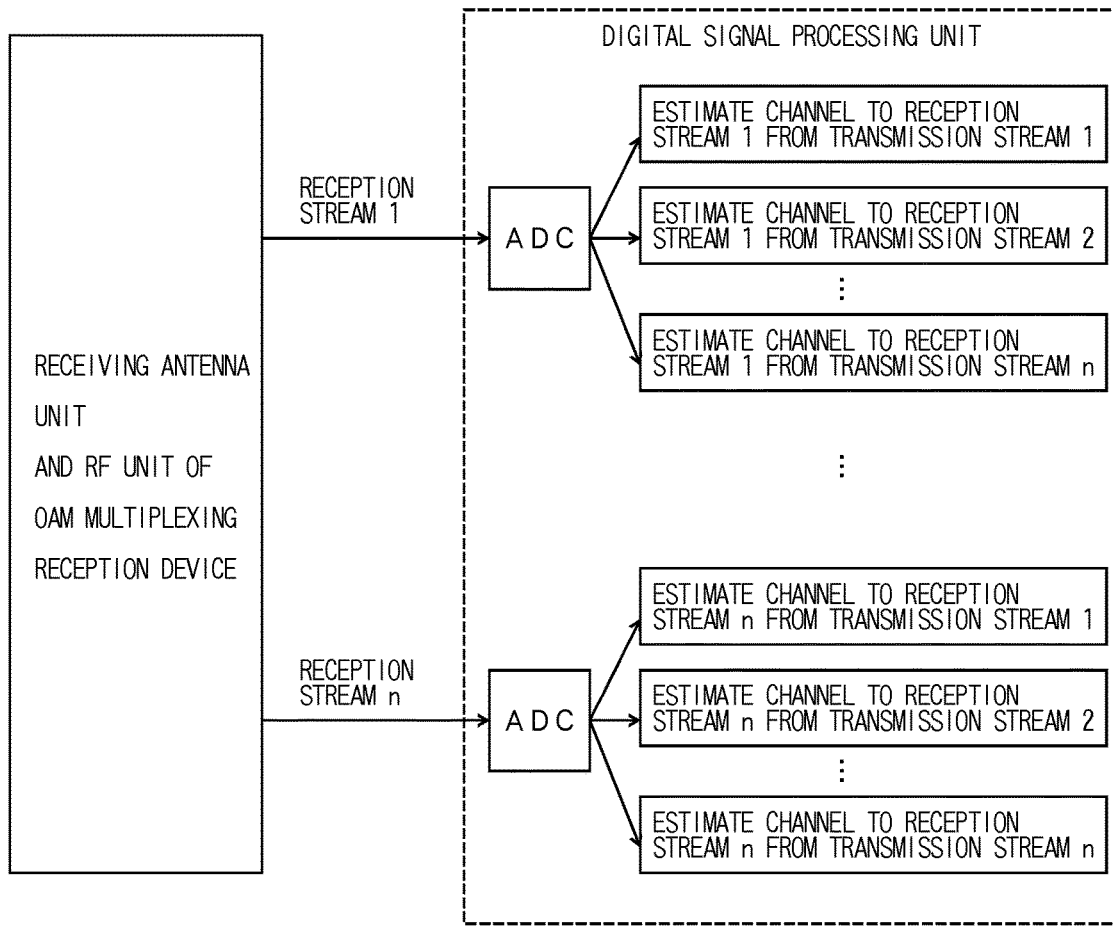
FIG. 11 is a diagram illustrating a channel estimation process example of the related art.

FIG. 6 illustrates a channel estimation process example in Example 2 of the present invention. In FIG. 6, the receiving antenna unit 21 and the RF unit 22 of the OAM multiplexing reception device are fundamentally the same as those in Example 1, but each reception stream is divided into small decomposition bands by using a band-pass filter (BPF) or the like, and the small decomposition bands are output as basebands (reverse to FIG. 5). For example, when the number of reception streams is n, and the number of small decomposition bands is m, signals in n×m basebands are output. In addition, n×m ADCs are provided, and convert respective outputs into digital signals.

In Example 2, instead of performing channel estimation (n×m) times, requiring a large calculation amount, signals in all small decomposition bands of a reception stream are collected, and channel estimation is performed from signals in small decomposition bands of all transmission streams to all small decomposition bands of each reception stream in a batch. Consequently, it is possible to reduce a calculation amount for channel estimation on a reception side.

(Example 2 of Transmission Stream)

When the number of multiplexed streams is four, the number of small decomposition bands of each stream is two, a value of time shift is 2, a length of a basic channel estimation signal sequence is 16 (c1, c2, . . . , c16), the longest channel response of all small decomposition bands of all streams is a length corresponding to a single sample, and a length of a CP is 3, channel estimation signal sequences of small decomposition bands of respective streams are as follows. An underline part indicates the CP.

A channel estimation signal sequence of a small decomposition band 1 of a transmission stream 1:
(c14, c15, c16, c1, c2, . . . , c15, c16)

A channel estimation signal sequence of a small decomposition band 1 of a transmission stream 2:
(c12, c13, c14, c15, c16, . . . , c13, c14)

A channel estimation signal sequence of a small decomposition band 1 of a transmission stream 3:
(c10, c11, c12, c13, c14, . . . , c11, c12)

A channel estimation signal sequence of a small decomposition band 1 of a transmission stream 4:
(c8, c9, c10, c11, c12, . . . , c9, c10)

A channel estimation signal sequence of a small decomposition band 2 of the transmission stream 1:
(c6, c7, c8, c9, c10, . . . , c7, c8)

A channel estimation signal sequence of a small decomposition band 2 of the transmission stream 2:
(c4, c5, c6, c7, c8, . . . , c5, c6)

A channel estimation signal sequence of a small decomposition band 2 of the transmission stream 3:
(c2, c3, c4, c5, c6, . . . , c3, c4)

A channel estimation signal sequence of a small decomposition band 2 of the transmission stream 4:
(c16, c1, c2, c3, c4, c1, c2)

Next, a description will be made of a signal into which signals in basebands of respective small decomposition bands of a reception stream 1 with respect to the example 2 of a transmission stream are combined being expressed as a circulant matrix. Herein, an example of the reception stream 1 will be described, but other reception streams may also be expressed as circulant matrixes. Here, a length of a channel response from a stream (xik) of a k-th small decomposition band of a transmission stream i to a stream (yjl) of an l-th small decomposition band of a reception stream j is supposed to be one time sampling length, and is represented by $h^{jl}_{ik}(h^{jl}_{ik}(0), h^{jl}_{ik}(1))$. Nij indicates a noise component.

Hereinafter, a description will be made of a channel estimation method on the reception side.

$$y11 = x11 * h_{11}^{11} + x21 * h_{21}^{11} + x31 * h_{31}^{11} + x41 * h_{41}^{11} + N11$$

$$y12 = x12 * h_{12}^{12} + x22 * h_{22}^{12} + x32 * h_{32}^{12} + x42 * h_{42}^{12} + N12 \quad (6)$$

Here, as illustrated in FIG. 6, if signals of streams of all small decomposition bands of the reception stream 1 are combined with each other (indicated by y1), Equation (7) is obtained.

$$y1 = y11 + y12$$
$$= x11 * h_{11}^{11} + x21 * h_{21}^{11} + x31 * h_{31}^{11} + x41 * h_{41}^{11} + x12 * h_{12}^{12} +$$
$$x22 * h_{22}^{12} + x32 * h_{32}^{12} + x4 * h_{42}^{12} + N1$$

$$N1 = N11 + N12$$

Here, in the same manner as in Example 1, if convolution is expressed as matrix calculation, Equation (8) is obtained.

$$\begin{bmatrix} y1(1) \\ y1(2) \\ y1(3) \\ y1(4) \\ \vdots \\ y1(19) \end{bmatrix} = \begin{bmatrix} c14 & 0 \\ c15 & c14 \\ c16 & c15 \\ c1 & c16 \\ \vdots & \vdots \\ c16 & c15 \end{bmatrix} x \begin{bmatrix} h_{11}^{11}(0) \\ h_{11}^{11}(1) \end{bmatrix} + \begin{bmatrix} c12 & 0 \\ c13 & c12 \\ c14 & c13 \\ c15 & c14 \\ \vdots & \vdots \\ c14 & c15 \end{bmatrix} + \quad (8)$$

$$x \begin{bmatrix} h_{21}^{11}(0) \\ h_{21}^{11}(1) \end{bmatrix} + \begin{bmatrix} c10 & 0 \\ c11 & c10 \\ c12 & c11 \\ c13 & c12 \\ \vdots & \vdots \\ c12 & c11 \end{bmatrix} x \begin{bmatrix} h_{31}^{11}(0) \\ h_{31}^{11}(1) \end{bmatrix} + \begin{bmatrix} c8 & 0 \\ c9 & c8 \\ c10 & c9 \\ c11 & c10 \\ \vdots & \vdots \\ c10 & c9 \end{bmatrix} +$$

$$x \begin{bmatrix} h_{31}^{11}(0) \\ h_{31}^{11}(1) \end{bmatrix} + \begin{bmatrix} c6 & 0 \\ c7 & c6 \\ c8 & c7 \\ c9 & c8 \\ \vdots \\ c8 & c7 \end{bmatrix} x \begin{bmatrix} h_{12}^{12}(0) \\ h_{12}^{12}(1) \end{bmatrix} + \begin{bmatrix} c4 & 0 \\ c5 & c4 \\ c6 & c5 \\ c7 & c6 \\ \vdots \\ c6 & c5 \end{bmatrix} x \begin{bmatrix} h_{22}^{12}(0) \\ h_{22}^{12}(1) \end{bmatrix} +$$

$$\begin{bmatrix} c2 & 0 \\ c3 & c2 \\ c4 & c3 \\ c5 & c4 \\ \vdots & \vdots \\ c4 & c3 \end{bmatrix} x \begin{bmatrix} h_{32}^{12}(0) \\ h_{32}^{12}(1) \end{bmatrix} + \begin{bmatrix} c16 & 0 \\ c1 & c16 \\ c2 & c1 \\ c3 & c2 \\ \vdots & \vdots \\ c2 & c1 \end{bmatrix} x \begin{bmatrix} h_{42}^{12}(0) \\ h_{42}^{12}(1) \end{bmatrix} + \begin{bmatrix} n(1) \\ n(2) \\ n(3) \\ n(4) \\ \vdots \\ n(19) \end{bmatrix}$$

Here, y1(k) and n(k) in Equation (8) respectively indicate a k-th signal and a k-th noise component of y1 in the time domain.

Equation (8) may be represented by a single matrix as in Equation (9) by using the feature that a channel estimation signal is obtained by time-shifting an identical basic channel estimation signal.

$$\begin{bmatrix} y1(1) \\ y1(2) \\ y1(3) \\ y1(4) \\ \vdots \\ y1(19) \end{bmatrix} = \begin{bmatrix} c14 & 0 & c12 & 0 & \cdots & c16 & 0 \\ c15 & c14 & c13 & c12 & \cdots & c1 & c16 \\ c16 & c15 & c14 & c13 & \cdots & c2 & c1 \\ c1 & c16 & c15 & c14 & \cdots & c3 & c2 \\ \vdots & \vdots & \vdots & \vdots & \ddots & \vdots & \vdots \\ c16 & c15 & c14 & c13 & \cdots & c2 & c1 \end{bmatrix} x \begin{bmatrix} h_{11}^{11}(0) \\ h_{11}^{11}(1) \\ h_{21}^{11}(0) \\ h_{21}^{11}(1) \\ h_{31}^{11}(0) \\ h_{31}^{11}(1) \\ h_{41}^{11}(0) \\ h_{41}^{11}(1) \\ h_{12}^{12}(0) \\ h_{12}^{12}(1) \\ h_{22}^{12}(0) \\ h_{22}^{12}(1) \\ h_{32}^{12}(0) \\ h_{32}^{12}(1) \\ h_{42}^{12}(0) \\ h_{42}^{12}(1) \end{bmatrix} + \begin{bmatrix} n(1) \\ n(2) \\ n(3) \\ n(4) \\ \vdots \\ n(11) \end{bmatrix} \quad (9)$$

Here, y1(1), y1(2), and y1(3) are signals corresponding to a CP, and thus are not used, and, if only y1(4) to y1(19) are used, Equation (10) is obtained.

$$\begin{bmatrix} y1(4) \\ y1(5) \\ \vdots \\ y1(11) \end{bmatrix} = \begin{bmatrix} c1 & c16 & c15 & c14 & \cdots & c3 & c2 \\ c2 & c1 & c16 & c15 & \cdots & c4 & c3 \\ \vdots & \vdots & \vdots & \vdots & \ddots & \vdots & \vdots \\ c16 & c15 & c14 & c13 & \cdots & c2 & c1 \end{bmatrix} x \begin{bmatrix} h_{11}^{11}(0) \\ h_{11}^{11}(1) \\ h_{21}^{11}(0) \\ h_{21}^{11}(1) \\ h_{31}^{11}(0) \\ h_{31}^{11}(1) \\ h_{41}^{11}(0) \\ h_{41}^{11}(1) \\ h_{12}^{12}(0) \\ h_{12}^{12}(1) \\ h_{22}^{12}(0) \\ h_{22}^{12}(1) \\ h_{32}^{12}(0) \\ h_{32}^{12}(1) \\ h_{42}^{12}(0) \\ h_{42}^{12}(1) \end{bmatrix} + \begin{bmatrix} n(4) \\ n(5) \\ \vdots \\ n(16) \end{bmatrix} \quad (10)$$

Here, the first matrix of the right term of Equation (10) is a circulant matrix. The circulant matrix is a channel estimation signal sequence and is thus known to the transmission side and the reception side. Therefore, the reception side may estimate an unknown channel by using the known circulant matrix and signals of each stream after an ADC process. Particularly, in the present invention, as represented in Equation (10), channel responses from all streams of the transmission side to each reception stream can be estimated in a batch.

Next, a description will be made of a channel estimation method using the feature that a circulant matrix is decomposed into a DFT matrix, a diagonal matrix, and an IDFT matrix. First, Equation (10) is represented by Equation (11).

$$\begin{bmatrix} y1(4) \\ y1(5) \\ \vdots \\ y1(19) \end{bmatrix} = \begin{bmatrix} DFT \\ (16 \times 16) \end{bmatrix} x \begin{bmatrix} C1 & 0 & \cdots & 0 \\ 0 & C2 & \cdots & 0 \\ \vdots & \vdots & \ddots & \vdots \\ 0 & 0 & \cdots & C16 \end{bmatrix} x \begin{bmatrix} IDFT \\ (16 \times 16) \end{bmatrix} x \begin{bmatrix} h_{11}^{11}(0) \\ h_{11}^{11}(1) \\ h_{21}^{11}(0) \\ h_{21}^{11}(1) \\ h_{31}^{11}(0) \\ h_{31}^{11}(1) \\ h_{41}^{11}(0) \\ h_{41}^{11}(1) \\ h_{12}^{12}(0) \\ h_{12}^{12}(1) \\ h_{22}^{12}(0) \\ h_{22}^{12}(1) \\ h_{32}^{12}(0) \\ h_{32}^{12}(1) \\ h_{42}^{12}(0) \\ h_{42}^{12}(1) \end{bmatrix} + \begin{bmatrix} n(4) \\ n(5) \\ \vdots \\ n(19) \end{bmatrix} \quad (11)$$

Here, DFT (16×16) and IDFT (16×16) respectively indicate a DFT matrix and an IDFT matrix of 16 points. In addition, C1, C2, . . . , and C16 are values obtained by performing a DFT process on the basic channel signal sequence (c1, c2, . . . , c16), and are thus known to the reception side. Since the circulant matrix is decomposed in Equation (11), if a DFT process, inverse matrix calculation of a diagonal matrix, and an IDFT process are performed on the column vector of [y1(4),y1(5), . . . , y1(19)], channel estimation from all of the transmission streams to the reception stream 1 is possible in a batch.

Calculation amounts of the DFT process and the IDFT process are 0 (n log n), and the inverse matrix calculation of a diagonal matrix is multiplication of scalar values and is thus 0 (n). This is smaller than 0 (n3) that is a calculation amount for inverse matrix calculation. Here, n is a size of a matrix (the number of rows).

As mentioned above, according to the present invention, it is possible to considerably reduce a calculation amount required for channel estimation. The description relates to a simple example, but may also be applied to cases of taking general values in the same manner.

Example 3

Example 3 is an example in which performance of channel estimation is improved while reducing an overhead of a channel estimation signal sequence and a calculation amount required for channel estimation by further using the feature of OAM multiplexing communication in Example 1 and Example 2.

A received signal in OAM multiplexing communication has a reception distribution different in each OAM mode. Specifically, as illustrated in FIG. 8, as an OAM mode becomes a higher-order mode, a location of a power peak value becomes more distant from the center. However, intensity distributions in identical OAM modes having different signs are the same as each other. Due to the feature of the OAM multiplexing communication, an intensity is the same at the reception time between the identical OAM modes having different signs, and thus interference increases. In addition, interference tends to increase between adjacent modes (for example, the OAM mode 1 and the OAM mode 2). By using the feature of the OAM multiplexing communication, time shift of a channel estimation signal sequence is adjusted, channel components between modes between which interference increases are disposed far away from each other, and thus it is possible to improve performance of channel estimation.

Here, a description will be made of a case (7 multiplex) where a single UCA and OAM modes −3, −2, −1, 0, 1, 2, and 3 are used in OAM multiplexing transmission and reception devices.

Channel estimation signal sequences are generated by using a basic channel signal sequence and through time shift thereof in an order of the OAM modes 1, 3, 2, 0, −1, −3, and −2. For example, when a length of a CP is 2, and a time shift value is 1, channel estimation signal sequences are set as follows. An underline part indicates the CP.

A channel estimation signal sequence (basic channel signal sequence) in the OAM mode 1:
  (c7 c8, c1, c2, c3, c4, c5, c6, c7, c8)
A channel estimation signal sequence (basic channel signal sequence) in the OAM mode 3:
  (c6, c7, c8, c1, c2, c3, c4, c5, c6, c7)
A channel estimation signal sequence (basic channel signal sequence) in the OAM mode 2:
  (c5, c6, c7, c8, c1, c2, c3, c4, c5, c6)
A channel estimation signal sequence (basic channel signal sequence) in the OAM mode 0:
  (c4, c5, c6, c7, c8, c1, c2, c3, c4, c5)
A channel estimation signal sequence (basic channel signal sequence) in the OAM mode −1:
  (c3, c4, c5, c6, c7, c8, c1, c2, c3, c4)
A channel estimation signal sequence (basic channel signal sequence) in the OAM mode −3:
  (c2, c3, c4, c5, c6, c7, c8, c1, c2, c3)
A channel estimation signal sequence (basic channel signal sequence) in the OAM mode −2:
  (c1, c2, c3, c4, c5, c6, c7, c8, c1, c2)

Through the above setting, channel components between modes between which interference increases are disposed far away from each other on a reception side. For example, a distance in the column vector of h in Equation (5) increases, and thus the influence of interference is suppressed such that performance can be improved.

Next, a description will be made of a case (28 multiplex) where four UCAs and OAM modes −3, −2, −1, 0, 1, 2, and 3 are used in OAM multiplexing transmission and reception devices. Time shift is set in an order of the OAM modes 1, 3, 2, 0, −1, −3, and −2 of each UCA. In other words, time shift is set in an order of the OAM modes 1, 3, 2, 0, −1, −3, and −2 of a UCA 1, the OAM modes 1, 3, 2, 0, −1, −3, and −2 of a UCA 2, the OAM modes 1, 3, 2, 0, −1, −3, and −2 of a UCA 3, and the OAM modes 1, 3, 2, 0, −1, −3, and −2 of a UCA 4.

Next, a description will be made of a case (7 multiplex and two small decomposition bands of each stream) where a single UCA and OAM modes −3, −2, −1, 0, 1, 2, and 3 are used, and two small decomposition bands are used, in OAM multiplexing transmission and reception devices.

Time shift is set in an order of the OAM modes 1, 3, 2, 0, −1, −3, and −2 of the small decomposition band. In other words, time shift is set in an order of the OAM modes 1, 3, 2, 0, −1, −3, and −2 of a small decomposition band 1, and the OAM modes 1, 3, 2, 0, −1, −3, and −2 of a small decomposition band 2.

Next, a description will be made of a case (14 multiplex and two small decomposition bands of each stream) where two UCAs and OAM modes −3, −2, −1, 0, 1, 2, and 3 are used, and two small decomposition bands are used, in OAM multiplexing transmission and reception devices.

Time shift is set in an order of the OAM modes 1, 3, 2, 0, −1, −3, and −2 of each small decomposition band of each UCA. In other words, time shift is set in an order of the OAM modes 1, 3, 2, 0, −1, −3, and −2 of a small decomposition band 1 of a UCA 1, the OAM modes 1, 3, 2, 0, −1, −3, and −2 of a small decomposition band 2 of the UCA 1, the OAM modes 1, 3, 2, 0, −1, −3, and −2 of a small decomposition band 1 of the UCA 2, the OAM modes 1, 3, 2, 0, −1, −3, and −2 of a small decomposition band 2 of the UCA 2.

In the above-described way, since the influence of interference of when a time shift value is less than a length of the maximum channel response can be reduced, it is possible to improve performance of channel estimation. In other words, since inter-mode interference is allowed to some extent, that is, adjacent interference in a channel estimation process is set to be reduced, a time shift value is not set to a length of the maximum channel response but is set to be larger than a length of a delay more than a preset threshold value, and thus it is possible to further reduce an overhead of a channel estimation signal sequence. For example, when channel responses of the OAM mode 1 have five time sampling lengths, and fourth and fifth channel responses are less than a threshold value, if a time shift value is set to 3, interference to channel estimation occurs due to the fourth and fifth channel responses, and thus the performance of the channel estimation deteriorates. However, modes of channel estimation signal sequences adjacent to a channel estimation signal sequence in the OAM mode 1 are the OAM modes 0 and 2, and thus it is possible to reduce the influence of the interference.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An OAM multiplexing transmission device that subjects a signal in an electromagnetic wave orbital angular momentum (OAM) mode to spatial multiplex transmission by using a uniform circular array (UCA) in which a plurality of antenna elements are disposed circularly at an equal interval, the OAM multiplexing transmission device comprising:
  a unit generating each of the transmission streams in a baseband (BB), in which a channel estimation signal sequence is disposed before a transmission target data signal sequence, and a cyclic prefix (CP) having a predetermined length is disposed in the first half of the channel estimation signal sequence, the channel estimation signal sequence is time-shifted with a channel estimation signal sequence (a basic channel estimation signal sequence) having a predetermined length and a zero correlation, by a predetermined shift value for each of the transmission streams;

a unit converting a baseband signal sequence of the generated transmission streams to frequency conversion into radio frequency (RF) band, or converting into intermediate frequency (IF) band and then converting into the RF band; and a unit converting a plurality of the frequency-converted transmission streams into a plurality of OAM mode signals having different orders, and multiplexing spatially by using the UCA.

2. The OAM multiplexing transmission device according to claim 1, wherein:

a band subjected to the spatial multiplex transmission is configured to be divided into small decomposition bands such that wireless communication is performed;

the unit generating each of the transmission streams in the baseband is configured to set as the channel estimation signal sequence in all small decomposition bands of all transmission streams by time-shifting a single basic channel estimation signal sequence; and the unit performing the frequency conversion is configured to convert all the small decomposition bands into the RF band to be combined into the entire band, or to convert all the small decomposition bands into the IF band and then into the RF band.

3. An OAM multiplexing reception device that receives a signal in an electromagnetic wave orbital angular momentum (OAM) mode subjected to spatial multiplex transmission by using a uniform circular array (UCA) in which a plurality of antenna elements are disposed circularly at an equal interval, the OAM multiplexing reception device comprising:

a unit receiving the received OAM mode signal to the UCA, demultiplexing the signal into reception streams in OAM modes of each order, and subjecting each of the reception streams to frequency-conversion from a radio frequency (RF) band into a baseband (BB), or subjecting each of the reception streams to frequency-conversion into an intermediate frequency (IF) band and then into the baseband; and a channel estimation unit converting a signal sequence in each of the reception streams subjected to the frequency-conversion into a digital signal, performing a DFT process with a predetermined length, multiplying a value obtained through the DFT process by a diagonal matrix having, as a diagonal component, an inverse number of a value obtained by performing an FFT process with the length of the DFT process on a channel estimation signal sequence (a basic channel estimation signal sequence) having a predetermined length and a zero correlation, performing an IDFT process with the same length as the length of the DFT process on a result of the multiplication, and using a value obtained by dividing a result of the IDFT process for each predetermined time shift amount as an estimation value of a channel response from all transmission streams to each of the reception streams.

4. The OAM multiplexing reception device according to claim 3, wherein:

a band subjected to the spatial multiplex transmission is configured to be divided into small decomposition bands such that wireless communication is performed;

the unit performing the frequency conversion is configured to convert each of small decomposition bands of each of the reception streams into the baseband, or to convert each of the small decomposition bands into the IF band and then into the baseband; and the channel estimation unit is configured to combine all the small decomposition bands of the reception streams with each other, and to use a value obtained by dividing, for each predetermined time shift amount, a result of performing a DFT process, multiplication of a diagonal matrix, and an IDFT process on a combined signal, as an estimation value of each small decomposition band channel response from each small decomposition band of all transmission streams to each of the reception streams.

5. An OAM multiplexing communication system that subjects a plurality of OAM mode signals to spatial multiplex transmission by disposing the UCA of the OAM multiplexing transmission device to face the UCA of the OAM multiplexing reception device according to claim 3.

6. The OAM multiplexing communication system according to claim 5, wherein interference between OAM modes is minimized by adjusting time shift in channel estimation such that channel components of signals in identical OAM modes having different signs or adjacent OAM modes are disposed far away from each other between the OAM multiplexing transmission device and the OAM multiplexing reception device.

7. An OAM multiplexing communication method subjecting a signal in an electromagnetic wave orbital angular momentum (OAM) mode to spatial multiplex transmission by using a uniform circular array (UCA) in which a plurality of antenna elements are disposed circularly at an equal interval, the OAM multiplexing communication method comprising:

causing an OAM multiplexing transmission device to execute a step generating each of the transmission streams in a baseband (BB), in which a channel estimation signal sequence is disposed before a transmission target data signal sequence, and a cyclic prefix (CP) having a predetermined length is disposed in the first half of the channel estimation signal sequence, the channel estimation signal sequence is time-shifted with a channel estimation signal sequence (a basic channel estimation signal sequence) having a predetermined length and a zero correlation, by a predetermined shift value for each of the transmission streams, a step converting a baseband signal sequence of the generated transmission streams to frequency conversion into radio frequency (RF) band, or converting into intermediate frequency (IF) band and then converting into the RF band, and a step converting a plurality of the frequency-converted transmission streams into a plurality of OAM mode signals having different orders, and multiplexing spatially by using the UCA; and causing an OAM multiplexing reception device to execute a step receiving the received OAM mode signal to the UCA, demultiplexing the signal into reception streams in OAM modes of each order, and subjecting each of the reception streams to frequency-conversion from a radio frequency band into a baseband, or subjecting each of the reception streams to frequency-conversion into an intermediate frequency band and then into the baseband, and a step converting a signal sequence in each of the reception streams subjected to the frequency-conversion into a digital signal, performing a DFT process with a predetermined length, multiplying a value obtained through the DFT process by a diagonal matrix having, as a diagonal component, an inverse number of a value obtained by performing an FFT process with the length of the DFT process on a channel estimation signal sequence (a basic channel estimation signal sequence) having a predetermined length and a zero correlation, performing an IDFT process with the same length as the length of the DFT process on a result of the multiplication, and performing channel estimation by using a value obtained by dividing a result of the IDFT process for each predetermined time shift amount as an estimation value of a channel response from all transmission streams to each of the reception streams.

8. The OAM multiplexing communication method according to claim 7, wherein:
 a band subjected to the spatial multiplex transmission is configured to be divided into small decomposition bands such that wireless communication is performed;
 in the step generating each of the transmission streams in the baseband, the channel estimation signal sequence is set in all small decomposition bands of all transmission streams by time-shifting a single basic channel estimation signal sequence;
 in the step performing the frequency conversion in the OAM multiplexing transmission device, all the small decomposition bands are converted into the RF band to be combined into the entire band, or all the small decomposition bands are converted into the IF band and then into the RF band;
 in the step performing the frequency conversion in the OAM multiplexing reception device, each of small decomposition bands of each of the reception streams is converted into the baseband, or each of small decomposition bands is converted into the IF band and then into the baseband; and
 in the step performing channel estimation, all the small decomposition bands of the reception streams are combined with each other, and a value obtained by dividing, for each predetermined time shift amount, a result of performing a DFT process, multiplication of a diagonal matrix, and an IDFT process on a combined signal is used as an estimation value of each small decomposition band channel response from each small decomposition band of all transmission streams to each of the reception streams.

* * * * *